Figure 1:
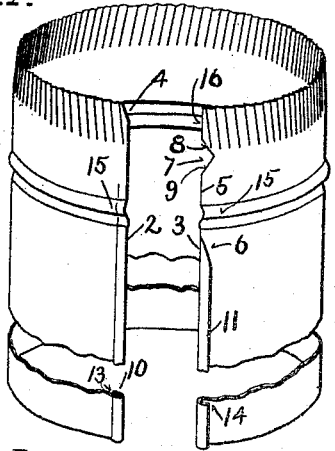

F. SCHMIDT.
STOVEPIPE.
APPLICATION FILED JULY 1, 1907.

940,406.

Patented Nov. 16, 1909.

Witnesses.
Homer Bradford.
Florence Quinn.

Inventor.
Frank Schmidt,
By R. F. Haksleb,
His Attorney.

UNITED STATES PATENT OFFICE.

FRANK SCHMIDT, OF CINCINNATI, OHIO, ASSIGNOR TO THE E. H. HUENEFELD COMPANY, OF CINCINNATI, OHIO, A CORPORATION OF OHIO.

STOVEPIPE.

940,406.

Specification of Letters Patent.   Patented Nov. 16, 1909.

Application filed July 1, 1907. Serial No. 381,700.

*To all whom it may concern:*

Be it known that I, FRANK SCHMIDT, a citizen of the United States, residing at Cincinnati, in the county of Hamilton and State of Ohio, have invented certain new and useful Improvements in Stovepipes, of which the following is a specification.

Figure 2:
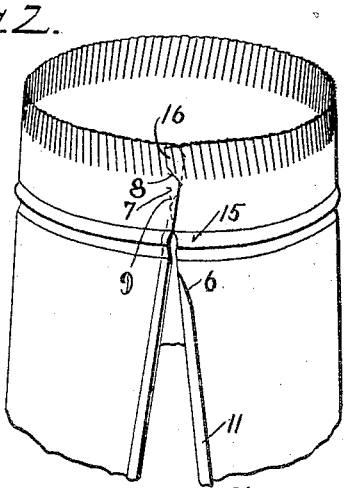
Figure 3:
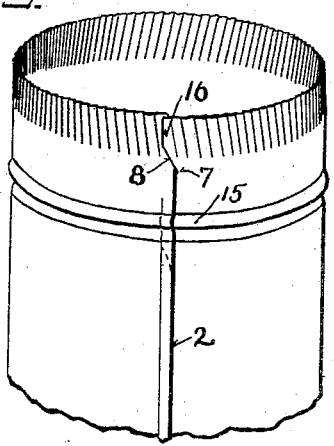
Figure 4:
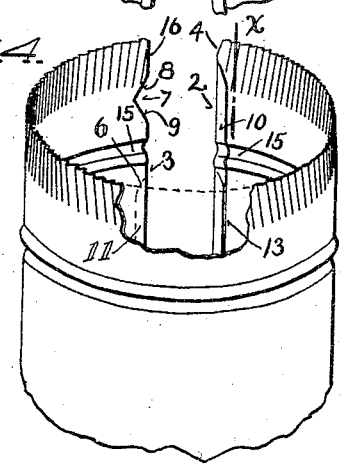
Figure 5:
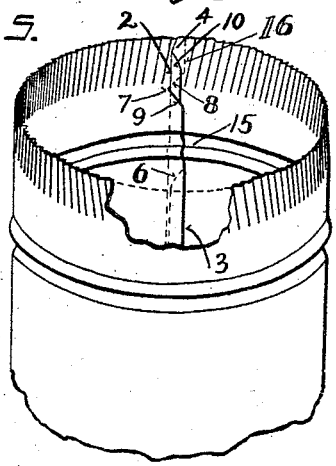
Figures 6, 7:
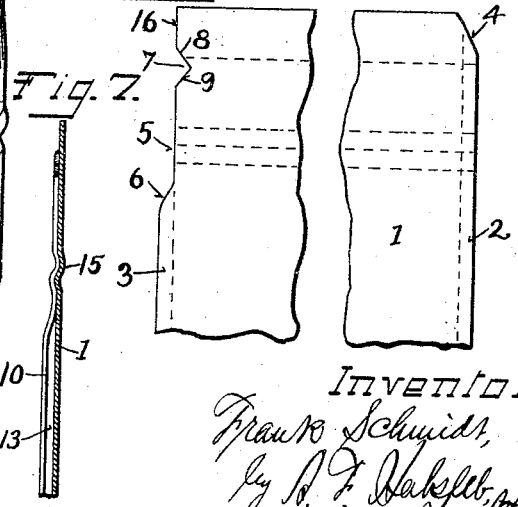

It is the object of my invention to provide a new and improved stove pipe having a lock formed in the blank of which the pipe is composed so as to avoid the necessity of employing separate locking parts, and the invention will be readily understood from the following description and claims, and from the drawing, in which latter:

Figure 1 is a perspective view of a pipe provided with my improved device showing the same in separated relation and partly broken away. Fig. 2 is a similar view of the same showing the same partly assembled for illustrating the manner in which the pipe is joined. Fig. 3 is a similar view showing the pipe in connected relation. Fig. 4 is an inside perspective view of the pipe in separated relation and partly broken away. Fig. 5 is a similar view of the same in connected relation. Fig. 6 is a plan view of the pipe-blank from which the pipe is formed, partly broken away; and, Fig. 7 is a sectional detail on the line *x* of Fig. 4.

1 represents the blank having longitudinal edges 2 3. The extreme end of one of these edges is provided with a slanting rabbet 4. The end of the other edge is provided with a rabbet 5 terminating in a taper 6. The edge has a notch 7, preferably having oppositely slanting walls, the respective walls 8 9 of which are arranged to be placed upon opposite sides of the opposing edge of the pipe-blank when the pipe is assembled for limiting the collapse of said pipe.

At the longitudinal edge 2, the pipe is provided with an inwardly extending flange 10, and at the longitudinal edge 3 the pipe is provided with an outwardly extending flange 11 having a tapering end formed by the taper 6 and forming an abbreviated turned meeting edge, the respective flanges forming pockets 13 14 into which the mating flanges are received in assembling the pipe. It will thus be noted that the pipe is formed of a sheet metal plate whose opposite edges are reversely turned. Adjacent one end of the pipe it is preferably provided with an ogee bead 15. The pocket 13 preferably terminates below the bead, with the extreme end of the inner flange 10 pressed against the body of the pipe for reinforcing the inner telescoping end of the pipe.

In assembling the pipe, the edge, upon which the inner pocket is formed, is received adjacent its end within the notch 7. A lip 16 is formed at the end of the longitudinal edge in which the notch 7 is located. The lip laps the outside of said edge upon which the inner pocket is formed, the upper wall 8 of said notch being received outside said edge and the lower wall 9 of the notch being received inside said edge. This partial assembling takes place while the longitudinal edges are held in relatively slanting position as shown in Fig. 2. The balance of the longitudinal edges of the pipe are then brought together and the respective flanges received within their mating pockets, the ogee bead positioning and locking the longitudinal edges of the pipe longitudinally. The seam may be thereupon suitably compressed or mashed together or permanently crushed for properly assembling the pipe and locking the same in permanent relation.

My improved construction permits the pipes to be formed up at the factory in large quantities and nested for shipment and shipped without danger of loss of any part that is necessary in assembling the pipes, as the entire seaming parts and lock are formed directly in the pipe-blank, and in such manner that any ordinary tinner can readily clamp the seam without special tools.

Having thus fully described my invention what I claim as new and desire to secure by Letters Patent is:

1. A pipe formed of a substantially rectangular metal sheet, one of the meeting edges of said sheet being turned inwardly and the other of said meeting edges being turned outwardly, both being interlocked to form a joint, one of said meeting edges having a portion cut away near one end of the pipe for forming an abbreviated turned meeting edge, the said meeting edge of the pipe where said portion is cut away being provided with a notch, and the other meeting edge resting within said notch, the pipe being also formed with a circumferential bead located between said notch and the end of said abbreviated turned meeting edge, substantially as described.

2. A pipe formed of a substantially rectangular metal sheet, one of the meeting edges of said sheet being turned inwardly and the other of said meeting edges being turned outwardly, both being interlocked to form a joint, one of said meeting edges having a portion cut away near one end of the pipe for forming an abbreviated turned meeting edge, the said meeting edge of the pipe where said portion is cut away being provided with a notch, the other of said meeting edges having a portion of its turned edge pressed against the face of the pipe at that end thereof at which said portion is cut away for forming a reinforced edge which rests within said notch, the pipe being also formed with a circumferential bead located between said notch and the end of said abbreviated turned meeting edge, substantially as described.

In testimony whereof I have subscribed my name hereto in the presence of two subscribing witnesses.

FRANK SCHMIDT.

Witnesses:
THEODORE C. JUNG,
HERMAN IMSANDE.